Patented June 18, 1935

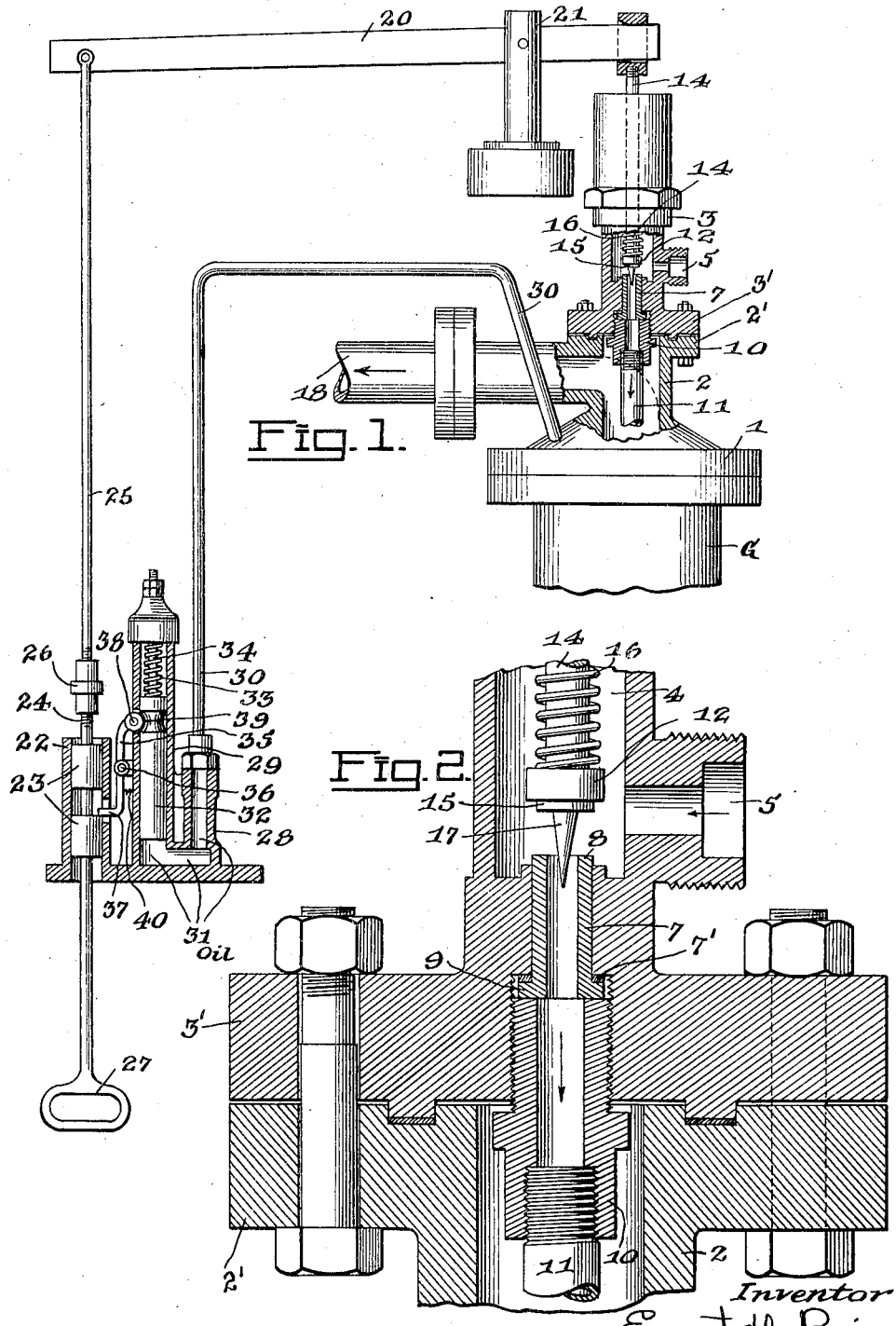

2,005,650

UNITED STATES PATENT OFFICE 2,005,650

APPARATUS FOR AUTOMATICALLY CONTROLLING DISCHARGE OF FLUIDS UNDER PRESSURE INTO A PRESSURE CHAMBER

Ernest Du Bois, Itterbeek, Chateau De Pierrefonds, Belgium, assignor to International Carbonic Engineering Company, Kennett Square, Pa., a corporation of Delaware Application September 14, 1931, Serial No. 562,811
In Belgium April 27, 1931

24 Claims. (Cl. 62—121)

This invention relates to certain improvements in apparatus for automatically controlling discharge of fluids under pressure into a pressure chamber; and the nature and objects of the invention will be readily recognized and understood by those skilled in the art in the light of the following explanation and detailed description of the accompanying drawing illustrating what I at present consider to be the preferred embodiments or mechanical expressions of my invention from among various other forms, arrangements, combinations and constructions of which the invention is capable within the spirit and scope thereof.

The problems and difficulties to the solution and practical elimination of which the present invention is primarily directed, arise and are met with particularly in the operation of those types of apparatus for producing solid carbon dioxide, in which liquid carbon dioxide is discharged and expanded through an expansion valve into a pressure chamber, with the resulting formation in the chamber of a portion of the liquid carbon dioxide to solid form and a portion thereof to gas. The carbon dioxide gas produced in the pressure chamber, or so-called solid carbon dioxide generator, is drawn or sucked off from the chamber during discharge and expansion of the liquid into the chamber at such a rate as to regulate the pressure in the chamber as may be desired. After the required quantity of solid carbon dioxide is formed in the pressure chamber, the withdrawal of gas from the chamber is stopped, then after a certain interval of time, depending upon the desired final pressure in the chamber, the discharge and expansion of liquid carbon dioxide from the expansion valve is cut off and stopped, after which the chamber pressure is reduced to atmospheric and the block of solid carbon dioxide removed.

One of the major problems encountered in such apparatus is due to the following conditions. As the liquid carbon dioxide is and must be maintained under very high pressures to retain the liquid state, if for any reason during operation of apparatus of the aforesaid or similar types, the gas is not withdrawn from the chamber sufficiently rapidly, or withdrawal is stopped for too long an interval, with continued discharge of liquid carbon dioxide under the liquefying pressures into the closed pressure chamber, the chamber pressure will build-up and increase to such a point as to be dangerous with possible bursting of the chamber or generator and resulting damage to or destruction of the apparatus and adjacent structures.

A main object of this invention is the provision of mechanism for operative association in such solid carbon dioxide producing apparatus, which mechanism is directly automatically controlled by the pressure in the generator or pressure chamber and is automatically operated to cause abrupt and immediate closing of the expansion valve to stop discharge of liquid carbon dioxide into the chamber, when the chamber pressure attains a predetermined or dangerous pressure; and further to provide such mechanism which is capable of adaptation generally to the automatic control and stopping of the discharge of fluids generally under pressure into a closed pressure chamber when the chamber pressure reaches a predetermined pressure.

A difficulty met with also in the operation of the types of solid carbon dioxide producing apparatus above referred to, as well as with similar apparatus, is the freezing or choking up of the expansion valve discharge into the pressure chamber or generator by the formation of ice crystals due to the presence of moisture or water in the carbon dioxide, as well as by the formation of carbon dioxide ice or snow crystals in the valve; and a further major object of this invention is the provision of a design of expansion and discharge valve for the liquid carbon dioxide, and in its operative relation with and the arrangement of, the automatic pressure controlled mechanism for closing the valve, by which the valve can be manually actuated to break away and clean the valve discharge to the pressure chamber of any ice or snow accumulations.

A further object of the invention resides in the provision of a design and mounting of the expansion valve seat and discharge member, to enable of ready removal and replacement therefrom and to operative installed position in of the pressure chamber or generator of such solid carbon dioxide producing apparatus.

With the foregoing general objects and results in view, as well as certain others which will be readily recognized from the following explanation, the invention consists in certain novel features in construction and in combinations and arrangements of parts, as will be more fully and particularly referred to and specified hereinafter.

Referring to the accompanying drawing, in which similar reference characters refer to corresponding parts throughout both figures thereof:

Fig. 1 is a view more or less diagrammatic, partly in elevation and partly in vertical section, showing the valve controlling mechanism of the invention operatively incorporated with a solid carbon dioxide producing apparatus, a portion only of the pressure chamber or generator of which being shown together with the liquid carbon dioxide expansion and discharge valve of the invention mounted therein.

Fig. 2 is an enlarged view in vertical section through the expansion valve mounting and valve seat and discharge member arrangement of Fig. 1, with the valve of the invention shown in elevation in open position.

The several features of the invention are presented in the accompanying drawing in one possible embodiment of which they are capable of being expressed, as combined with and operatively incorporated in one type of solid carbon dioxide producing apparatus. However, the illustrated embodiment of the invention herein disclosed is by way of example and not of limitation as the principles and several features of the invention are capable of various other embodiments and for use with various other types of apparatus than the solid carbon dioxide apparatus here shown, where similar or equivalent conditions are encountered. It is to be understood, therefore, that my present invention contemplates and includes such other embodiments and adaptations which utilize and apply the features and principles forming and within the basic conception of the invention.

In the particular example hereof, referring now to Fig. 1 of the accompanying drawing, a portion of a solid carbon dioxide producing apparatus of a type in which the problems and difficulties overcome with the invention are met with in a high degree, is disclosed as including the generator G, in which the solid carbon dioxide is produced. The upper end portion only of this generator or chamber G is here shown, as it is not deemed necessary to disclose the entire generator which is to be considered as of the usual form familiar in the art as providing a closed chamber having the usual removable lower end closure to permit of removing the solid carbon dioxide formed in the generator.

The upper end of generator G is closed by the usual end closure 1, but which closure in this instance is provided with an upwardly extending tubular neck 2 terminating at its upper end in the horizontal flange 2' therearound. A head assembly 3 is removably secured on and to the upper end of neck 2 by bolting head flange 3' to neck flange 2'. The head assembly 3 provides a closed chamber 4 therewithin and the side wall of chamber 4 is formed with an inlet or intake 5 for connection with any suitable source of liquid carbon dioxide (not shown) and by which liquid carbon dioxide is discharged into and supplied to head chamber 4 under liquefying pressures. The closed bottom wall of head chamber 4 is provided with a vertical bore axially therethrough into and through which a discharge tube member 7 is relatively tightly but removably fitted with its upper end disposed within the lower end of chamber 4 and forming and providing an annular valve seat 8. (See Fig. 2).

The lower end of tube member 7 is formed with a flange 9 therearound which is disposed in the upper end of an enlarged bore in axial continuation of tube 7 receiving bore, and a coupling member 10 is threaded upwardly into such enlarged bore into engagement with flange 9. A washer 7' is interposed between flange 9 and the upper end of coupling 10 receiving bore, around tube 7, and tube 7 is forced upwardly with its flange 9 tight against washer 7' to form a gas tight joint. Coupling 10, thus secures and maintains valve seat forming discharge tube 7 in position against displacement (see Fig. 2). Coupling member 10 is formed with an axial bore therethrough of greater diameter than the bore of tube 7 but in downward continuation thereof. Coupling member 10 depends into neck 2 and has the tube 11 threaded into its lower end, which tube extends downwardly through the bore in neck 2, into and discharges at the upper end of pressure chamber or generator G. An expansion and discharge passage is thus formed leading from head chamber 4 to and discharging into generator G, through which liquid carbon dioxide is discharged and expanded.

The valve seat forming tube 7, can be removed for adjustment or replacement by detaching head assembly 3 from neck 2 and unscrewing coupling member 10 from the head to release tube 7, which is then accessible for withdrawal. By this arrangement, forming a feature of the invention, the quick repair or adjustment of the valve seat forming discharge tube 7 is made possible, while by the alined coupling of tube 7, coupling 10, and tube 11, an expansion and discharge passage for liquid carbon dioxide from chamber 4 into generator G is formed of gradually increasing diameter, which is found to be of considerable advantage and efficiency.

The discharge of liquid carbon dioxide from chamber 4 to generator G, is controlled by the expansion valve 12, vertically reciprocally mounted in chamber 4 by the valve stem or actuating rod 14 extending upwardly through chamber 4 and projecting upwardly above head 3, rod 14 being suitably journaled for reciprocation in head 3 to raise and lower valve 12. Valve 12 is formed with an annular, preferably metallic face 15, referring here to Fig. 2 in particular, and when the valve is in lowered position face bears against and seats upon the valve seat 8 to close tube 7 and cut off and stop discharge of liquid carbon dioxide to generator G. The valve 12 is normally forced downwardly to closed position on its seat 8 by a coiled expansion spring 16 mounted around valve actuating rod 14 and which spring is compressed when the valve is raised to open, unseated position by its actuating rod 14.

The discharge valve 12 is formed and provided with a depending conical extension 17, which extends into the upper end of discharge tube 7 with the valve in raised, open position (see Fig. 2) but without closing the tube, the extent or area of the discharge opening in the upper end of the tube 7, thus being variable and adjustable by varying the extent or length of cone 17 which extends into the tube 7 with the valve in raised position. The base or upper end of the depending cone 17 is given a diameter equal to the internal upper end diameter of tube 7 and valve seat 8 formed thereby, so that, in lowered closed and seated position of the valve, the base of cone 17 fits into, occupies and closes the upper end of tube 7. By this arrangement, it is possible to clean and remove any accumulations, such as ice, on the valve seat 8 and obstructing the end of tube 7, by raising and lowering valve 12 to cause cone 17 to break away and clear seat 8 and the upper end of tube 7 of obstructions.

In the usual manner, generator G is provided with a conduit 18, referring to Fig. 1 of the drawing by which the gas in generator G is drawn off during expansion of the liquid and discharge into the generator, the withdrawn gas being supplied to the usual compressor (not shown) for liquefying. With the apparatus in operation to produce solid carbon dioxide in generator G, liquid carbon dioxide is supplied to chamber 4, valve 12 is opened, and the liquid discharges through tube 7, coupling 10 and tube 11 into and expands in generator G to form a portion thereof as a solid and a portion as gas. The gas is withdrawn by conduit 18 at such a rate to maintain a desired pressure in generator G.

Now, in accordance with the principal feature of the invention, mechanism is provided for maintaining valve 12 open against spring 16 during normal operation of generator G, but which automatically releases valve 12 when the pressure in generator G reaches a predetermined pressure. A form and arrangement of such a mechanism is disclosed by way of example in Fig. 1 of the drawing, to which reference is now made.

A horizontally disposed arm 20 is pivotally mounted intermediate its ends to a fixed support 21, and has one end pivotally connected to the upper end of valve actuating rod 14, so that, by rocking arm 20 valve 12 is raised and lowered from and to closed position on seat 8. The opposite end of arm 20 is operatively connected with means for maintaining the arm in valve opened position, and for releasing the arm for abrupt closing of valve 12 under the action of spring 16, when pressure in generator G reaches a predetermined point.

For example, a vertically disposed tubular casing 22 reciprocally receives and mounts a double piston member 23 therein, the upper end of which double piston is connected by the rods 24 and 25 with the free end of horizontal rocker arm 20. Rods 24 and 25 are externally threaded at their adjacent ends, and are connected by the coupling sleeve 26, which is internally threaded to receive the ends of these rods, and which coupling sleeve enables the length of connected rods 24—25 to be varied to adjust the normal open position of valve 12, as will be later explained. An operating handle 27 is connected to the lower end of double piston member 23 and in the example hereof, depends downwardly therefrom, and permits of manual reciprocation of member 23 and rods 24—25, to rock lever 20 and raise and lower valve 12, and thereby reciprocate valve cone 17 in the upper end of valve seat and discharge tube 7 to clear valve seat 8 and the tube 7 of ice or other accumulations.

The double piston member 23 is normally maintained in position to hold expansion valve 12 open against the tension of spring 16, by means which is directly controlled and actuated by a predetermined pressure in generator G, to release member 23 and permit spring 16 to abruptly and quickly force the valve to closed position on and against valve seat 8. Such means in this specific instance happens to take the form of a U-tube providing the vertically disposed cylinders 28 and 29, in communication with each other at their lower ends, as will be clear by reference to Fig. 1. The upper end of cylinder 28 is connected and placed in communication with the upper end of pressure chamber or generator G by the tube or pipe 30, and a body of oil or other non-compressible fluid 31 is placed in the U-tube formed by cylinders 28 and 29. In the cylinder 29, a piston 32 is reciprocally mounted above the column of oil 31, and is normally maintained in lowered position to the normal oil level, by the spring 33 mounted between the upper end of piston 32 and the head of cylinder 29, the spring 33 being mounted on and around a guide rod 34 which slidably enters a suitable bore or opening in the piston.

The arrangement of the oil body 31 and spring 33 with respect to the pressure in generator G, is such that throughout a range of pressures up to a predetermined pressure, spring 33 maintains piston 32 in normal lowered position, but upon the pressure reaching a predetermined one in generator G, oil 31 is forced downwardly in cylinder 28 and the column thereof in cylinder 29 is raised and forces piston 32 upwardly against and overcoming tension of spring 33. Upon reduction in the pressure in generator G below that at which spring 33 is overcome, such spring returns piston 32 and the body of oil 31 to their normal positions shown in Fig. 1.

The piston 32 controls a locking or catch member 35 in the form of a vertically disposed lever pivotally mounted intermediate its ends at 36 to the cylinder 29 adjacent casing 22, and between the cylinder 29 and such casing. The lower end of lever member 35 is bent to form a finger or catch 37 which extends movably through an opening in the side wall of casing 22, in position to extend between double pistons 23 and engage the upper end of the lower of such pistons to hold rods 24—25 and lever 20 in position holding valve 12 raised and open against valve actuating spring 16. The upper end of catch or locking lever member 35 is provided with a rounded head 38 which extends through an opening in the wall of piston 32 for, and held inwardly in continuous, engagement with the piston by the expansion spring 40 interposed between the finger or catch 37 end of lever member 35 and cylinder 29. The piston 32 is formed with a side wall depression 39 therearound of a size to receive and form cam surfaces for head 38 of lever member 35. The arrangement is such that when piston 32 is in normal lowered position, lever 35 head 38 drops into the depression 39 and permits of spring 40 rocking lever member 35 to swing finger or catch 37 into casing 22, but when piston 32 is moved upwardly head 38 is engaged by the side wall thereof and lever 35 is rocked and held against spring 40 to withdraw finger or catch 37 from casing 22.

In operation of the apparatus hereinbefore described, the liquid carbon dioxide expansion and discharge valve 12 is raised to open position by pulling downwardly on handle 27 until finger or catch 37 engages over the lower piston of the double piston member 23, which catch then holds and maintains valve 12 in open operative position against spring 16, as will be clear by reference to Fig. 1.

The extent of valve opening is readily adjustable by coupling sleeve 26, to increase or decrease the length of connected rods 24—25, and rocking lever 20 to adjusted position.

Now, if for any reason the pressure in generator G reaches a predetermined pressure, the piston 32 is forced upwardly in cylinder 29 against the force exerted by spring 33, and lever member 35 is rocked to withdraw catch 37 from engagement with double piston member 23. Immediately upon release by catch 37 of member 23, spring 16 acts to abruptly force the valve 12 downwardly onto its seat 8 and the discharge and expansion of liquid carbon dioxide into the pressure chamber or generator G, is stopped. When the pressure in generator G has fallen sufficiently, valve 12 can be again opened by pulling double piston member 23 downwardly until catch 37 is in engaged position, piston 32 having been forced downwardly to normal position by spring 33 under the drop in generator pressure below the predetermined pressure.

In the event of ice or other obstructions accumulating on valve seat 8 or in the end of discharge tube 7, by reciprocating double piston 23 with handle 27, through the range determined by the space b between the pistons of member 23, with catch 37 in inwardly projected position, valve 12 is raised and lowered and cone 17 given a restricted reciprocation in the upper end of tube 7, to break away such accumulation. If desired or found necessary, catch 37 can be swung and held in withdrawn position to permit of raising and lowering valve 12 to and from seat engagement, where the more limited reciprocation may be found not sufficient to clear the valve seat. During the foregoing operations of valve seat and discharge tube cleaning, the supply of liquid carbon dioxide to chamber 4 may be stopped or cut off.

A further advantage of an arrangement of my invention is to permit of the operator increasing the pressure in the generator G for a short period, which pressure increase is desired in certain methods of operation of solid carbon dioxide producing apparatus. For example, valve 12 is normally open and the passage area between tube 7 and depending valve cone 17 is regulated and fixed to desired adjustment by catch 37 and length of connected rods 24—25. Now, if handle 27 is pulled downwardly a distance permitted by the space between pistons forming member 23, the valve 12 and cone 17 are raised and the passage area between tube 7 and cone 17 is increased, with resulting increase in flow of liquid into generator G and increase in generator pressure. Such a pressure increase is carefully controlled and regulated by the operator as required, through manual operation of the handle 27.

Thus, with the arrangement of the invention, the danger of the pressure increasing in the pressure chamber or generator G beyond a predetermined maximum safe pressure, is eliminated, by controlling the liquid carbon dioxide discharge and expansion valve 12, for immediate, automatic closing of the valve, in accordance with and directly from the pressures in generator G. In this way, the possible dangerous results of the carelessness or inattention of an operator, or failure in the functioning of the apparatus to maintain proper generator pressures during operation, are automatically eliminated and prevented.

While, the invention is particularly effective with solid carbon dioxide producing apparatus of the types referred to and disclosed in the example hereof, the invention is capable of adaptation to and incorporation with various types of apparatus generally which include the discharge of fluids under pressure into a pressure chamber in which it is desirable or expedient to automatically control or cut-off discharge to the pressure chamber in accordance with the pressures therein. Therefore, it is to be understood that the invention contemplates and includes within its scope, such other adaptations and applications, and the various embodiments and mechanical expressions necessary in carrying out the same.

It is also evident that various other forms, arrangements, variations, substitutions, eliminations and additions might be resorted to without departing from the spirit and scope of my invention, and hence I do not wish to limit myself in all respects to the exact and specific disclosures hereof.

What I claim, is:

1. In combination in apparatus including a pressure chamber, a valve for admitting fluid under pressure into said chamber, a spring normally forcing said valve to closed position; mechanism for maintaining said valve in open position against the force of said spring, and means solely controlled by fluid pressure in the pressure chamber for actuating said mechanism to release the valve for closing at a predetermined pressure in said chamber.

2. In combination in apparatus including a pressure chamber, a valve for admitting fluid under pressure into said chamber, a spring normally forcing said valve to closed position; mechanism for maintaining said valve in open position against the force of said spring, and means at the exterior of the pressure chamber, including a body of non-compressible fluid subjected to the pressure in the pressure chamber, for actuating said mechanism at a predetermined pressure in the pressure chamber to release the valve for closing by said spring.

3. In combination in apparatus including a pressure chamber, a normally closed valve for opening to admit a fluid under pressure into said chamber; mechanism for releasably maintaining said valve open, and means remote from the chamber controlled by the fluid pressure in said chamber for actuating said mechanism to release the valve for closing at a predetermined chamber pressure.

4. In combination, apparatus for producing solid carbon dioxide, including a generator, an expansion and discharge valve for admitting liquid carbon dioxide into said generator for formation therein of solid and gaseous carbon dioxide, a conduit from said generator for withdrawing the carbon dioxide gas from the generator to maintain the required pressures in the generator during discharge of liquid carbon dioxide therein, with means controlled solely by the fluid pressure in the generator for causing immediate closing of the valve automatically when the pressure increases in the generator to a predetermined high pressure.

5. In combination in apparatus including a pressure chamber, a normally closed valve for opening to admit a fluid under pressure to said chamber, mechanism for actuating said valve to open the same, and means for releasably maintaining said valve mechanism in valve opening position, including a locking member for releasably engaging said mechanism, a piston for withdrawing said locking member to release the mechanism for closing of the valve, and a body of a non-compressible fluid under the influence of the pressure in said chamber for actuating said piston to withdraw the locking member and release the valve mechanism to close the valve at a predetermined pressure in the chamber.

6. In combination, apparatus for producing solid carbon dioxide, including a generator, an expansion and discharge valve for admitting liquid carbon dioxide to the generator for formation therein of solid and gaseous carbon dioxide, an annular valve seat for receiving and on which the valve seats in closed position cutting off discharge of liquid carbon dioxide to the generator, an extension on the valve extending through said valve seat, and means operatively connected with the valve for relatively rapidly reciprocating the same toward and from said valve seat to reciprocate said extension through and break away obstructing accumulations on the valve seat.

7. In combination in apparatus for producing solid carbon dioxide, a generator, an expansion valve having an annular valve face for discharging and expanding liquid carbon dioxide into the generator, an annular valve face seat receiving and engaging said valve in closed position thereof shutting-off discharge of liquid into the generator, a conical projection extending axially from the valve through said annular seat, the base of said projection having a diameter to fit into and fully engage within said seat when the valve is closed, and means for manually moving said valve to and from seated position to reciprocate said conical projection through the valve seat to clear obstructions from the valve seat.

8. In combination in apparatus for producing solid carbon dioxide, a generator, an expansion valve for discharging liquid carbon dioxide into said generator, yielding means normally maintaining said valve closed, mechanism for actuating said valve to open position against said yielding means, means controlled by the pressure in the generator for releasably maintaining said valve actuating mechanism in valve opening position, said pressure controlled means operated to release said mechanism for immediate closing of said valve by the yielding means at a predetermined pressure in the generator, and said valve actuating mechanism operable independently of said pressure controlled means for moving the valve toward and from closed position.

9. In apparatus for producing solid carbon dioxide, a generator, a head assembly thereon forming a supply chamber therewithin for receiving liquid carbon dioxide, a liquid carbon dioxide discharge and expansion tube removably mounted through a wall of said head, the end of said tube within the supply chamber forming an annular valve seat, a valve movable to and from closed position on said seat, a tube of greater diameter than said valve seat forming tube extending into the generator, and a coupling member placing said tubes in communication and removably mounted for removal of said valve seat forming discharge tube.

10. In combination in apparatus for producing solid carbon dioxide, a generator, an expansion valve for discharging liquid carbon dioxide into said generator, yielding means normally maintaining said valve closed, mechanism for actuating said valve to open position against said yielding means, means controlled by the pressure in the generator for releasably maintaining said valve actuating mechanism in valve opening position, said pressure controlled means operated to release said mechanism for immediate closing of said valve by the yielding means at a predetermined pressure in the generator, an annular seat for said valve, a conical projection extending axially from the valve through said annular seat, said valve actuating mechanism operable independently of said pressure controlled means for increasing temporarily the passage of liquid through the valve to increase the normal pressure in the generator.

11. In apparatus for producing solid carbon dioxide, a generator, a head assembly thereon forming a supply chamber therewithin for receiving liquid carbon dioxide, a liquid carbon dioxide discharge and expansion tube removably mounted through a wall of said head, the end of said tube within the supply chamber providing an annular valve seat, a valve within the supply chamber movable to and from closed position on said seat, and an expansion tube of greater diameter than said valve seat forming tube in communication at one end with the latter tube and extending therefrom and discharging into the generator.

12. In apparatus for producing solid carbon dioxide, a generator including a liquid carbon dioxide receiving supply chamber, a liquid carbon dioxide discharge and expansion tube removably mounted in said generator with one end thereof providing an annular valve seat within the supply chamber, a valve movable to and from closed position on said valve seat, a tube of greater diameter than said valve seat forming tube extending and discharging into the generator, and a coupling member placing said tubes in communication and removably mounted for removal of said valve seat forming tube, said coupling member providing a passage therethrough of greater diameter than the valve seat forming tube but of smaller diameter than the passage through said tube discharging into the generator.

13. In combination in apparatus including a pressure chamber, a normally closed valve for opening to admit a fluid under pressure into said pressure chamber, mechanism at the exterior of the pressure chamber operatively associated with said valve for releasably maintaining the valve open, and means remote from the pressure chamber controlled by the fluid pressure in said chamber for actuating said mechanism to release the valve for closing at a predetermined chamber pressure.

14. In combination in apparatus including a pressure chamber, means for admitting a fluid under pressure into said chamber, said means normally closed to shut off fluid admission, mechanism for maintaining said means in open fluid admitting position, and fluid pressure controlled means at the exterior of but in operative communication with the pressure chamber for actuating said mechanism to close said fluid admitting means at a predetermined chamber pressure.

15. In combination in apparatus for producing solid carbon dioxide, a generator, valve means for admitting liquid carbon dioxide into said generator, a conduit for withdrawal of gaseous carbon dioxide from the generator to maintain the desired pressures in the generator during discharge of liquid carbon dioxide therein, mechanism for opening and closing said valve means, and fluid pressure controlled means for actuating said mechanism, said pressure control means in operative communication with the generator and actuating said mechanism to cause the valve means to shut-off liquid admission at a predetermined pressure in the generator.

16. In apparatus for producing solid carbon dioxide, a generator providing a pressure chamber therewithin, means for admitting liquid carbon dioxide into the pressure chamber, mechanism for operating said means to admit or cut-off liquid admission to the pressure chamber, fluid pressure actuated means removed from the pressure chamber and operatively associated with said mechanism, and the said latter means in operative communication with the pressure chamber for actuation by a predetermined chamber pressure to operate the mechanism to cause said liquid admitting means to cut-off liquid admission to the pressure chamber.

17. The combination with a generator for forming solid carbon dioxide, including a chamber within the generator and valve means controlling discharge of liquid carbon dioxide into said chamber; of pressure actuated means at the exterior of the chamber operatively associated with said valve means and in communication with said chamber, said pressure actuated means operated by a predetermined chamber fluid pressure to cause said valve means to shut-off discharge of liquid carbon dioxide into said chamber.

18. In apparatus for producing solid carbon dioxide, a generator including a chamber within which the solid carbon dioxide is formed, valve means for controlling discharge of liquid carbon dioxide into said chamber, operating mechanism for opening or closing said valve means to control or shut-off discharge of the liquid into the chamber, and fluid pressure actuated means at the exterior of but in communication with said chamber, said pressure actuated means operatively associated with the operating mechanism for the valve means and actuated by a predetermined pressure in the chamber to cause the operating mechanism to close the valve means to shut-off discharge of liquid into the chamber.

19. In apparatus for producing solid carbon dioxide, a generator having a chamber within which the solid carbon dioxide is produced, normally closed valve means for opening to discharge liquid carbon dioxide into said chamber, mechanism for releasably maintaining said valve means open for discharge of liquid into the chamber, pressure actuated means remote from the pressure chamber operatively coupled to said mechanism to cause operation thereof to release and close the valve means, and a pressure tube placing said pressure actuated means in communication with the generator chamber for actuation of said means by a predetermined chamber pressure to cause closing of the valve means to shut-off discharge of liquid carbon dioxide into the chamber.

20. In combination, in apparatus for producing solid carbon dioxide, a generator including a pressure chamber, a normally closed valve for opening to admit liquid carbon dioxide into said chamber, mechanism operatively associated with said valve for releasably maintaining the valve open a distance for discharge of liquid carbon dioxide into the chamber to maintain a predetermined normal fluid pressure therein, means controlled by the fluid pressure in said chamber for actuating said mechanism to release the valve for closing at a predetermined above normal fluid pressure in the chamber, and the said valve while maintained in normal open position by said mechanism operable independently thereof for increasing the discharge of liquid into the chamber to increase the normal chamber pressure.

21. In combination, in apparatus for producing solid carbon dioxide, a generator including a pressure chamber, a normally closed valve for opening to admit liquid carbon dioxide into said chamber, mechanism operatively associated with said valve for releasably maintaining the valve open a distance for discharge of liquid carbon dioxide into the chamber at a rate to maintain a predetermined normal fluid pressure therein, means controlled by the fluid pressure in the chamber for actuating said mechanism to release the valve for closing when the fluid pressure in the chamber attains a predetermined high pressure, and manually actuated means for further opening the valve independently of said mechanism and while maintained thereby against closing, for increasing the discharge of liquid into the chamber to increase the normal chamber pressure.

22. In combination, in apparatus for producing solid carbon dioxide including a pressure chamber, a valve seat and a normally closed valve on said seat for opening to admit liquid carbon dioxide into said chamber, mechanism operatively associated with said valve for releasably maintaining the valve partially open a distance for discharge of liquid carbon dioxide into the chamber at a rate to maintain a predetermined normal fluid pressure therein, and manually actuated means for operation to further open the valve independently of said mechanism and while the valve is maintained against closing thereby, for increasing the discharge of liquid into the chamber to increase the normal chamber pressure, the said manually actuated means operable for reciprocation of the valve toward and from its seat to break away obstructions from the valve seat.

23. In apparatus for producing solid carbon dioxide including a pressure chamber, a valve controlling discharge of liquid carbon dioxide into said chamber, yielding means normally maintaining said valve closed, mechanism for releasably maintaining said valve in partially open position against said yielding means for discharge of liquid carbon dioxide into the chamber at a rate to substantially maintain a predetermined normal fluid pressure therein, the said valve while held against closing by said mechanism is free for movement against said yielding means to further opened position for increasing liquid discharge into the chamber to increase the normal fluid pressure in the chamber, and means for moving said valve while held by said mechanism.

24. In combination in apparatus including a pressure chamber, a normally closed valve for opening to admit a fluid under pressure into said chamber, mechanism operatively associated with said valve for releasably maintaining the valve open in a predetermined open position, means controlled by the fluid pressure in said chamber for actuating said mechanism to release the valve for closing at a predetermined chamber pressure, and manually operated means connected with said valve associated mechanism for moving said valve independently of said chamber pressure controlled means toward and from a predetermined valve open position while the valve is maintained in such open position by said mechanism.

ERNEST DU BOIS.